US007186907B2

(12) United States Patent
Inouye

(10) Patent No.: US 7,186,907 B2
(45) Date of Patent: Mar. 6, 2007

(54) PIANO KEY ASSEMBLY

(76) Inventor: Asami Inouye, 180 Riverside Blvd. #511, New York, NY (US) 10069

( * ) Notice: Subject to any disclaimer, the term of this patent is extended or adjusted under 35 U.S.C. 154(b) by 187 days.

(21) Appl. No.: 11/113,205

(22) Filed: Apr. 22, 2005

(65) Prior Publication Data

US 2005/0235804 A1 Oct. 27, 2005

(51) Int. Cl.
*G01C 3/18* (2006.01)

(52) U.S. Cl. ........................................................ 84/236

(58) Field of Classification Search .............. 84/16–20, 84/433, 439, 243, 423 R, 440, 236

See application file for complete search history.

(56) References Cited

U.S. PATENT DOCUMENTS 633,915 A 9/1899 Smith
1,589,745 A * 6/1926 Federle ........................ 84/433
2,031,748 A 2/1936 Vietor
5,585,582 A 12/1996 Stanwood
5,796,024 A 8/1998 Stanwood
6,096,959 A 8/2000 Davide
6,531,651 B2 * 3/2003 Kanemitsu et al. ........... 84/433

* cited by examiner

*Primary Examiner*—Kimberly Lockett
(74) *Attorney, Agent, or Firm*—Milde & Hoffberg, LLP

(57) ABSTRACT

A piano key mechanism for a pianoforte with improved dynamic performance has weights placed within each keystick in the region between the pivot point of each key and a point midway between the pivot point and the ivory end of the keystick. The arrangement of weights reduces the overall inertia of the keysticks thus improving the dynamic performance of the musical instrument and results in an average of the downweight and upweight which is heavier than the conventionally accepted value for that key on a keyboard.

6 Claims, 1 Drawing Sheet

PIANO KEY ASSEMBLY

BACKGROUND OF THE INVENTION

1. Field of Invention

The invention relates to a piano key assembly for a pianoforte (grand piano) having weighted keysticks to achieve an improved dynamic response.

2. Description of Prior Art

The technique of keystick balancing for a pianoforte (that is, a grand piano) has seen little change in the past 100 years. The U.S. Pat. No. 633,915 to Smith taught the placement of lead weights within the keystick to balance a key in such manner as to make it properly responsive to the touch of the pianist. More recently, the U.S. Pat. No. 5,585,582 to Stanwood ("Stanwood 1") teaches a method to determine the proper amount of balance weight to place within a keystick during manufacturing to provide a more uniform feel when playing. The U.S. Pat. No. 5,796,024 to Stanwood ("Stanwood 2") teaches a method for fixing the amount of balance weight and varying an additional calibration weight to achieve the desired balance. The U.S. Pat. No. 6,096,959 to Davide applies keystick balancing to an upright piano key mechanism with the addition of balance weight to the keystick and the wippen. The U.S. Pat. No. 6,531,651 to Kanemitser et al. discloses a musical instrument key with a means for simplifying the adjustment of weights.

Conventional balancing methods and recent improvements such as these focus on the static balance of the keystick and ignore the effect weigh-off has on the internal inertia of the key. Lead weights placed near the "ivory end" of keystick require the piano player to move the weights a greater distance than if the weight were placed closer to the pivot point (fulcrum). (As used hereinafter, the term "ivory end" of a keystick is intended to denote the end of the keystick that is pressed down by the finger(s) of a piano player, regardless of whether the keystick does or does not have "ivory", or whether the keystick is or is not associated with a "white" key or "black" key.) Stanwood 2 and Davide, both improvements to the teaching of Stanwood 1, increase the keystick inertia with the addition of more weight. While both may create an instrument with keysticks uniformly balanced, the dynamic performance of the instrument is negatively impacted by the inertia increases.

U.S. Pat. No. 2,031,748 to Vietor discloses a technique for balancing the keys of a piano keyboard by the placement of lead weights in the keysticks. Unlike the other prior art references, this patent is concerned with the placement of balance weights to maximally reduce the inertia of the keys. In particular, this patent teaches the placement of a large weight and small weight immediately adjacent the pivot point of the keystick. While this arrangement does, indeed, reduce the inertia to an absolute minimum, it does not provide sufficient static balance weight for a piano key.

SUMMARY OF THE INVENTION

It is a principal object of the present invention to provide a piano key assembly for a pianoforte—that is, a grand piano—which is optimally balanced, using balance weights, for improved "feel" and performance of the instrument.

This object, as well as other objects which will become apparent from the discussion that follows, are achieved, in accordance with the present invention, by properly locating the center of gravity of the balance weights along each keystick of the key assembly and adjusting the amount of weight for optimal static and dynamic performance of the pianoforte.

More particularly, in accordance with the present invention, the center of gravity of the weights is arranged along each keystick between a first point, halfway between the pivot point and the ivory end of the keystick, and a second point along the keystick halfway between the first point and the pivot point. The amount of weight applied at this center of gravity is preferably adjusted so that the average of the static downweight and upweight for each keystick is in the range of 10 to 20 grams heavier than the conventionally accepted value for that keystick on a keyboard.

Piano keys weighted according to the present invention permit better control and faster action. The downweight is heavier than the conventional 45–55 grams, depending upon the position of the key on the keyboard, and an upweight heavier than the conventional 19–29 grams. The heavier downweight makes the keys feel firmer when played softly, as compared to the conventional weighing. Positioning the weights toward the pivot point decreases the amount of force required to accelerate each key thus creating a lighter feel when played loud. The heavier upweight drives the key to the original position faster without key bounce or flutter. Touch sensitivity is maximized and keys feel extremely responsive and natural to a pianists touch.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
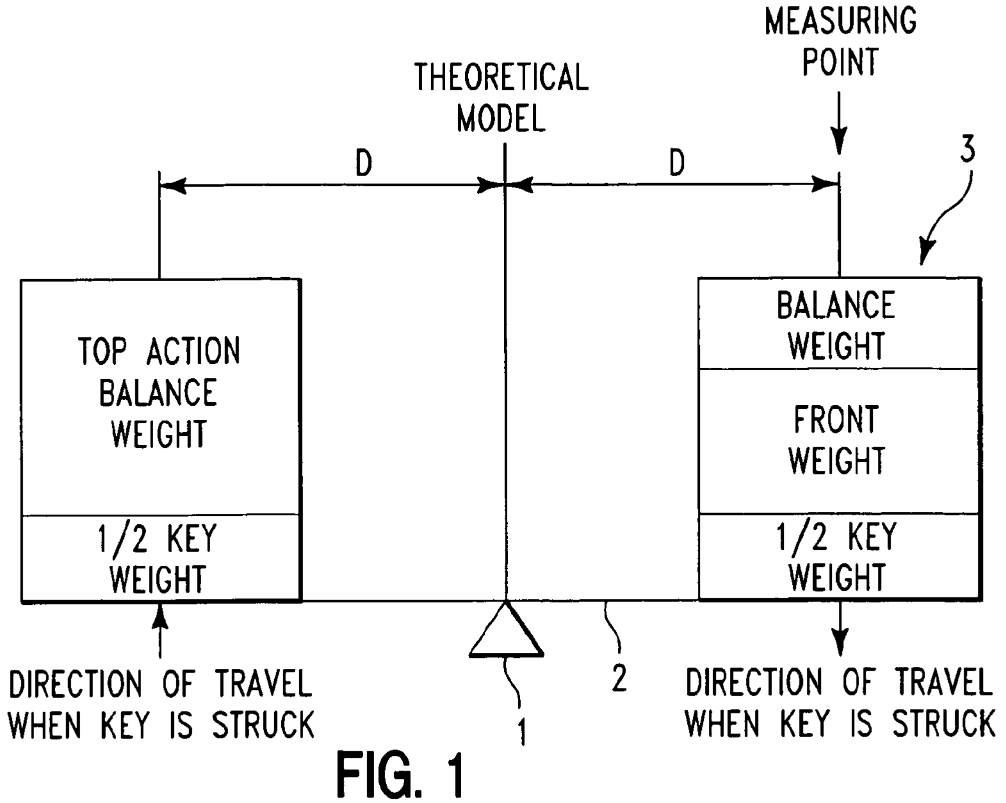
FIG. 1 shows a theoretical model of the weights acting on a piano key, as shown in Stanwood 1.

The preferred embodiments of the present invention will now be described with reference to FIGS. 1–3 of the drawings. Identical elements in the various figures are designated with the same reference numerals.

The present invention provides an improvement to the prior art because it takes into consideration the inertia of the lead weights and the amount of force required in the dynamic operation of the key.

FIG. 1 represents the weights in a single piano keystick as taught by Stanwood 1. Each keystick is a simple balance beam which consists of a keystick 2, a pivot point 1 and a hammer assembly and wippen which apply a force to the keystick 2. Force applied to the one end of the piano key, by the piano player, causes downward movement of the ivory end of the keystick. The downward force creates movement which translates to an upward force applied to the wippen and hammer assembly by way of the capstan screw that projects upward from the keystick. When depressing a key, the piano player must overcome the imbalance in the key, the friction from various sources including the wippen and hammer assembly as well as the key itself, and the internal inertia of the key.

In the prior art, the practice of keystick balancing places balance weights 3 in the keystick 2 in order to achieve a uniform downweight for all keys. In obtaining the proper static balance, the critical element is selecting the correct amount of weight to produce an offsetting downward force of the static force exerted by the hammer-assembly and wippen. In prior art, the position of placement of the weight in the keystick is not critical. In Stanwood 1 lead weights are placed on top of the keystick and slid in small increments along the keystick until the correct positions for the proper static balance are found. Holes are then drilled in the side of the keystick and the weights are inserted in the holes.

In fact, when balancing a keystick to achieve a static balance, the position of the weight, relative to the pivot point 1, is irrelevant. As shown in FIG. 2, the placement of 40 grams a distance of D from the pivot point 1 is equal to 20 grams at a distance of 2D or 10 grams at 4D. The amount of torque generated by each is equal to 40D grams.

Although positioning of weight, relative to the pivot point, is irrelevant for static balancing, the placement is critical to the dynamic performance.

Figure 2:
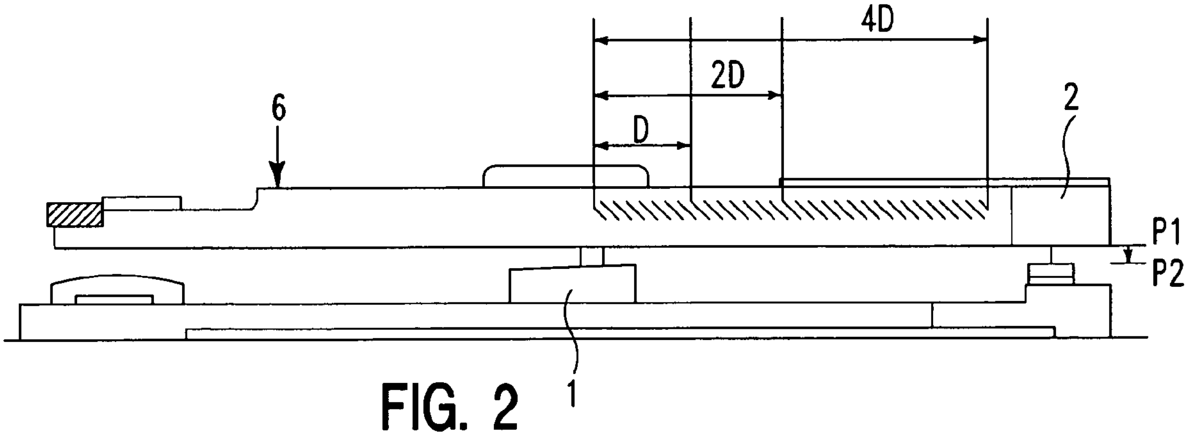
FIG. 2 is a side view of a piano key showing the distance of applied weight from the pivot point.

As will be appreciated from considering FIG. 2, playing a note is a dynamic process. When depressing a key the ivory end of the keystick moves from position P1 to position P2. The distance traveled is small in comparison to the radius from the pivot point, therefore the movement can be treated as linear. This distance of keystick travel is directly proportional to the distance along the keystick from the pivot point.

The work performed by depressing an individual key is equal to:

ti $\text{Work}=F_{(Force)}*D_{(Distance)}$

The force applied to depress a key is equal to:

$$F=M_{(Mass)}*A_{(Acceleration)}$$

Assuming a constant acceleration the relationship between velocity, acceleration and position can be written as:

$$V^2_{(final)}=V^2_{(start)}+2A(P_{(final)}-P_{(start)})$$

$$A=(V^2_{(final)}-V^2_{(start)})/2(P_{(final)}-P_{(start)})$$

With the initial velocity of the keystick equal to zero and the distance between $P_{(final)}-P_{(start)}$ equal to D, force can be written as:

$$F=M_{(mass)}*V^2_{(final)}/2D$$

Combining the two equations, the work required to play an individual note is equal to:

$$\text{Work}=(M_{(Mass)}*V^2_{(final)}/2D)*D$$

$$\text{Work}=\tfrac{1}{2}M*V^2_{(final)}$$

In FIG. 2, the weight placed a distance of 4D from the pivot point 1 will travel four times the distance of a weight placed a distance of D from the pivot point 1 when a key is played. Since movement occurs during the same time period, the final velocity at a distance of 4D is four times the final velocity at a distance of D. The relationship between the distance from the pivot point and final velocity is linear, while the work is proportional to the square of the velocity. The dynamic performance is therefore improved by moving the balance weight toward the pivot point. The louder an instrument is played, the more benefit this technique provides.

The total force required to depress a key is the sum of the static and dynamic forces required to move the keystick. The static force, or downweight, is the same regardless of the speed in which a note is played. The dynamic force is dependant on the amount of the balance weight, the placement of the weight relative to the pivot point and the speed in which the key is depressed.

By reducing the dynamic force required to depress a key, conventional balancing parameters can be ignored. Conventionally accepted downweight is typically in the range of 45 to 55 grams, depending upon the position of the key on the keyboard, which results in a conventionally accepted upweight in the range of 19 to 29 grams. Reduction in the dynamic force allows the downweight and upweight to be increased above the conventional values. Increase in the downweight is accomplished by reducing the total balance weight which further improves the dynamic performance.

Increase in the downweight provides additional benefits. One is that keys feel firmer to the touch, resulting in more control. More force is required to start movement, because of the increase in downweight, but once movement starts, the reduction in the dynamic force make the keys feel natural and less stressful to play. Another benefit is that an increase in downweight also increases the upweight, the upward restoring force of the key. Increasing the upward restoring force, with a reduction in the dynamic force that must be overcome, reduces the amount of time it takes for the keystick to return to its original position with a minimum of key bounce or flutter.

According to the invention, improvement in the dynamic performance is accomplished by repositioning the center of gravity of the balance weights in closer proximity to the pivot point 1 of the keystick 2.

When calculating the amount of weight to add to a keystick, one can start with a theoretical keystick model wherein all friction is eliminated from the keystick, wippen and hammer assembly. Without friction, the downweight exactly equals the upweight.

Since friction easily changes with lubrication, humidity and wear and tear on the key assembly, it is more practical not to incorporate these factors when determining the numbers and the positions of the required weights.

In the prior art, the center of gravity of all the lead weights was placed as close as possible to the ivory end of the key to minimize the number of weights required. The most commonly used lead weights in a keystick weigh about 14.5 grams each. These weights are placed in holes in the keystick which, to preserve the structural integrity of the keystick, have to be separated, from one hole to the next, by a solid wood section which is at least equal in length to the diameter of the holes.

With the center of gravity placed as close to the ivory end of the keystick as possible, the conventional piano required as many as six or seven lead weights in each keystick in the bass region, four or five lead weights in each keystick in the midsection and one, two or three lead weights on each keystick in the treble.

Figure 3:
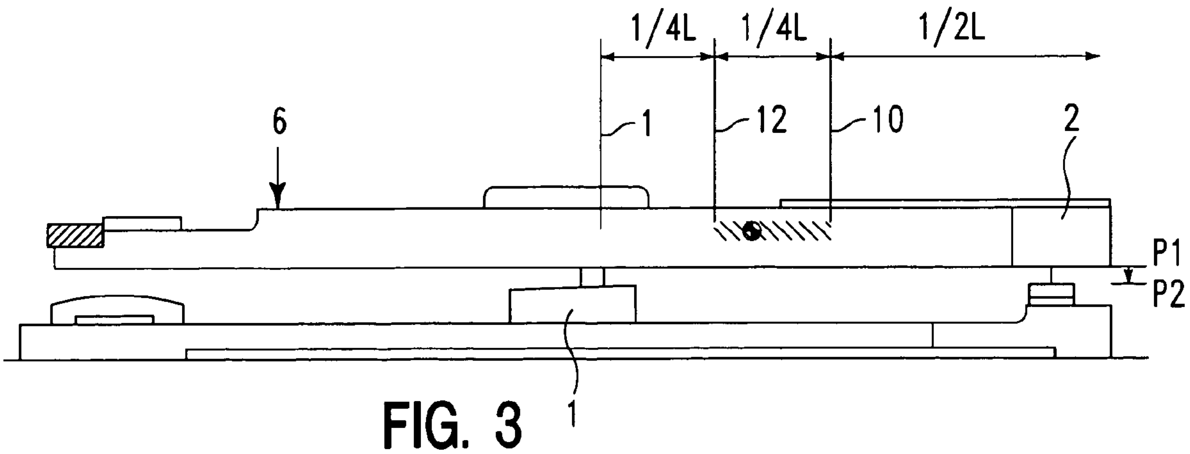
FIG. 3 is a side view of a keystick with balance weights positioned in accordance with the present invention.

Referring to FIG. 3, it is has been found, by experimentation, that the optimum position for the center of gravity of the balance weights is located between a first point 10 which is midway between the pivot point 1 and the ivory end of the keystick 2 and a second point 12 which is halfway between the first point 10 and the pivot point 1. In other words, if the total distance between the pivot point and the ivory end of the keystick is L, the first point 10 is a distance one-half L from the end of the keystick and the second point 12 is a distance one-quarter L away from the first point 10 in the direction of the pivot point 1.

Even though the center of gravity of the lead weights is moved from the conventional region between the first point

10 and the ivory end of the keystick to the region between the first point 10 and the second point 12, it may not be necessary to add an additional lead weight to the keystick. It has been found by experimentation to be advantageous if the average of the static downweight and static upweight of the keystick 2, so balanced, is in the range of 10 to 20 grams heavier than the conventionally accepted value for that keystick on a keyboard. The conventional values are 45–55 grams for the downweight and 19–29 grams for the upweight, for a conventional average in the range of 32 to 42 grams. According to the invention, this average may be increased to the range of 42 to 62 grams. Preferably also, the average of the static downweight and static upweight on each key is at least 50 grams for the lowest key assembly in a grand piano (e.g., key No. 1) and at least 40 grams for the highest key assembly (e.g., key No. 88).

Notwithstanding this permissible increase in the average of downweight and upweight, if additional weight is necessary, a lead weight can be glued beneath the keystick or placed in a hole that is closer to the ivory end of the keystick than the midway point 10.

There has thus been shown and described a novel piano key assembly which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. In a piano key assembly for a pianoforte for causing a musical tone to be played by the pianoforte, said key assembly comprising, in combination:

a) an elongate keystick having two ends, one end of said keystick being adapted to be depressed by a human finger;

b) a fulcrum for holding said keystick at a pivot point substantially midway between said two ends;

c) at least one weight arranged on said keystick to impart a desired static downweight thereto, said at least one weight having a center of gravity;

the improvement wherein said center of gravity of said at least one weight is arranged on said keystick between a first point along said keystick, halfway between said pivot point and said one end, and a second point along said keystick halfway between said first point and said pivot point, thereby to improve the dynamic response of said keystick.

2. A pianoforte having a plurality of piano key assemblies as defined in claim 1 arranged side by side on a keyboard and numbered consecutively from the lowest key assembly in the bass register to the highest key assembly in the treble, wherein the average of a static downweight and a static upweight on each key is at least 50 grams for the lowest key assembly and 40 grams for the highest key assembly.

3. The piano key assembly defined in claim 1, wherein said at least one weight includes a plurality of weights arranged on said keystick.

4. The piano key assembly defined in claim 3, wherein all of said weights are disposed in said keystick between said pivot point and said first point.

5. The piano key assembly defined in claim 3, wherein at least some of said weights are arranged in round openings on said keystick, said openings being spaced apart at least by a distance equal to their diameter.

6. The piano key assembly defined in claim 2, wherein the average of the static downweight and static upweight for each keystick is in the range of 10 to 20 grams heavier than the conventionally accepted value for that keystick on the keyboard.

* * * * *